United States Patent
Lang et al.

(10) Patent No.: US 12,298,714 B2
(45) Date of Patent: May 13, 2025

(54) HOLOGRAM COMMUNICATION CONTINUITY

(71) Applicant: AT&T Intellectual Property I, L.P., Atlanta, GA (US)

(72) Inventors: Howard L Lang, Wayside, NJ (US); Joseph Soryal, Glendale, NY (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 865 days.

(21) Appl. No.: 17/487,068

(22) Filed: Sep. 28, 2021

(65) Prior Publication Data

US 2023/0096129 A1    Mar. 30, 2023

(51) Int. Cl.
| | |
|---|---|
| *G06F 3/048* | (2013.01) |
| *G03H 1/00* | (2006.01) |
| *G03H 1/08* | (2006.01) |
| *G03H 1/22* | (2006.01) |
| *H04L 67/306* | (2022.01) |
| *H04M 3/56* | (2006.01) |

(52) U.S. Cl.
CPC ............ *G03H 1/08* (2013.01); *G03H 1/0005* (2013.01); *G03H 1/2249* (2013.01); *H04L 67/306* (2013.01); *H04M 3/567* (2013.01); *G03H 2001/0088* (2013.01)

(58) Field of Classification Search
CPC ...... G03H 1/08; G03H 1/0005; G03H 1/2249; G03H 2001/0088; H04L 67/306; H04L 63/0428; H04M 3/567; H04M 2203/1025
See application file for complete search history.

(56) References Cited

U.S. PATENT DOCUMENTS

| | | | |
|---|---|---|---|
| 2012/0170089 A1* | 7/2012 | Kim | G06F 1/1647 |
| | | | 359/9 |
| 2014/0049559 A1* | 2/2014 | Fleck | G02B 27/0103 |
| | | | 345/633 |
| 2016/0006985 A1* | 1/2016 | Hines | H04M 3/567 |
| | | | 348/14.08 |

(Continued)

FOREIGN PATENT DOCUMENTS

CN    116848839 A   * 10/2023  ............. G06N 3/006

*Primary Examiner* — Rashawn N Tillery
(74) *Attorney, Agent, or Firm* — Guntin & Gust, PLC; Kenneth S. Kwan

(57) ABSTRACT

Intelligent hologram communication continuity (e.g., using a computerized tool) is enabled. A method can comprise: determining, by a device comprising a processor, a context associated with a live interaction, wherein the live interaction is associated with a user profile and transmitted via a network; determining, by the device, hardware data representative of hardware associated with transmission of the live interaction via the network; in response to a hardware criterion being determined to be threshold satisfied by the hardware data, generating, by the device, using a hologram generation model and based on the context, a synthetic hologram associated with the live interaction, wherein the hologram generation model has been generated based on machine learning applied to past context data representative of past contexts of past live interactions associated with the user profile, from prior to the live interaction; and transmitting, by the device, the synthetic hologram instead of the live interaction.

20 Claims, 12 Drawing Sheets

(56) References Cited

U.S. PATENT DOCUMENTS

| | | | |
|---|---|---|---|
| 2016/0253835 A1* | 9/2016 | Conness | G06F 3/013 |
| | | | 715/716 |
| 2018/0173417 A1* | 6/2018 | Foresti | G06F 3/013 |
| 2018/0211183 A1* | 7/2018 | Innes | G06Q 30/0269 |
| 2018/0322674 A1* | 11/2018 | Du | G06T 19/006 |
| 2019/0206128 A1* | 7/2019 | Logan | H04N 21/21805 |
| 2019/0260705 A1* | 8/2019 | Gurievsky | H04L 51/04 |
| 2019/0369736 A1* | 12/2019 | Rakshit | G06F 3/011 |
| 2021/0060405 A1* | 3/2021 | Karafin | A63B 71/0622 |
| 2022/0326760 A1* | 10/2022 | Karafin | G06F 3/011 |
| 2022/0335698 A1* | 10/2022 | Kim | G06T 15/10 |
| 2022/0413433 A1* | 12/2022 | Parra Pozo | G06T 7/194 |
| 2023/0127438 A1* | 4/2023 | Karadayi | G06T 17/005 |
| | | | 345/419 |
| 2024/0073376 A1* | 2/2024 | Bazin | G09G 5/12 |
| 2024/0214454 A1* | 6/2024 | Singh | G06F 3/011 |

* cited by examiner

HOLOGRAM COMMUNICATION CONTINUITY

TECHNICAL FIELD

The disclosed subject matter relates to holographic communication continuity and, more particularly, to mixed reality holographic communication, e.g., transmitted over fourth generation (4G), fifth generation (5G), and/or sixth generation (6G) wireless networks.

BACKGROUND

Holographic Mixed Reality (MR) is a combination of naked-eye 3D spatial imaging technology and MR technology. The application of holographic MR and high-speed Internet communication technologies (e.g., 4G, 5G, and/or 6G technologies) can enable systems to transmit large quantities of associated data.

However, high-speed internet (e.g., high-speed wireless communication) is not ubiquitous, and there exist regions in which mobile internet is unavailable (e.g., in rural areas) or highly congested (e.g., in densely populated areas). As a result, there exist some areas in which communication strength is sufficient to transmit a live hologram during calls, and other areas for which hologram projection will be unavailable or poorly projected (e.g., not smooth or cutting in/out)

Additionally, privacy concerns exist in that some situations do not lend themselves to the projection of live holograms (e.g., if a user is driving, or at home and wants their surroundings to remain private).

Further, image capture for holographic MR generally requires cameras from more than one angle (e.g., from multiple vantage points). However, a speaker or subject of a hologram can be located in an area in which it is difficult to obtain live camera images from multiple angles (e.g., when not in a formal studio such as on a walk in a park with only a smartphone).

The above-described background relating to hologram communication continuity is merely intended to provide a contextual overview of some current issues and is not intended to be exhaustive. Other contextual information may become further apparent upon review of the following detailed description.

DETAILED DESCRIPTION

Figure 1:
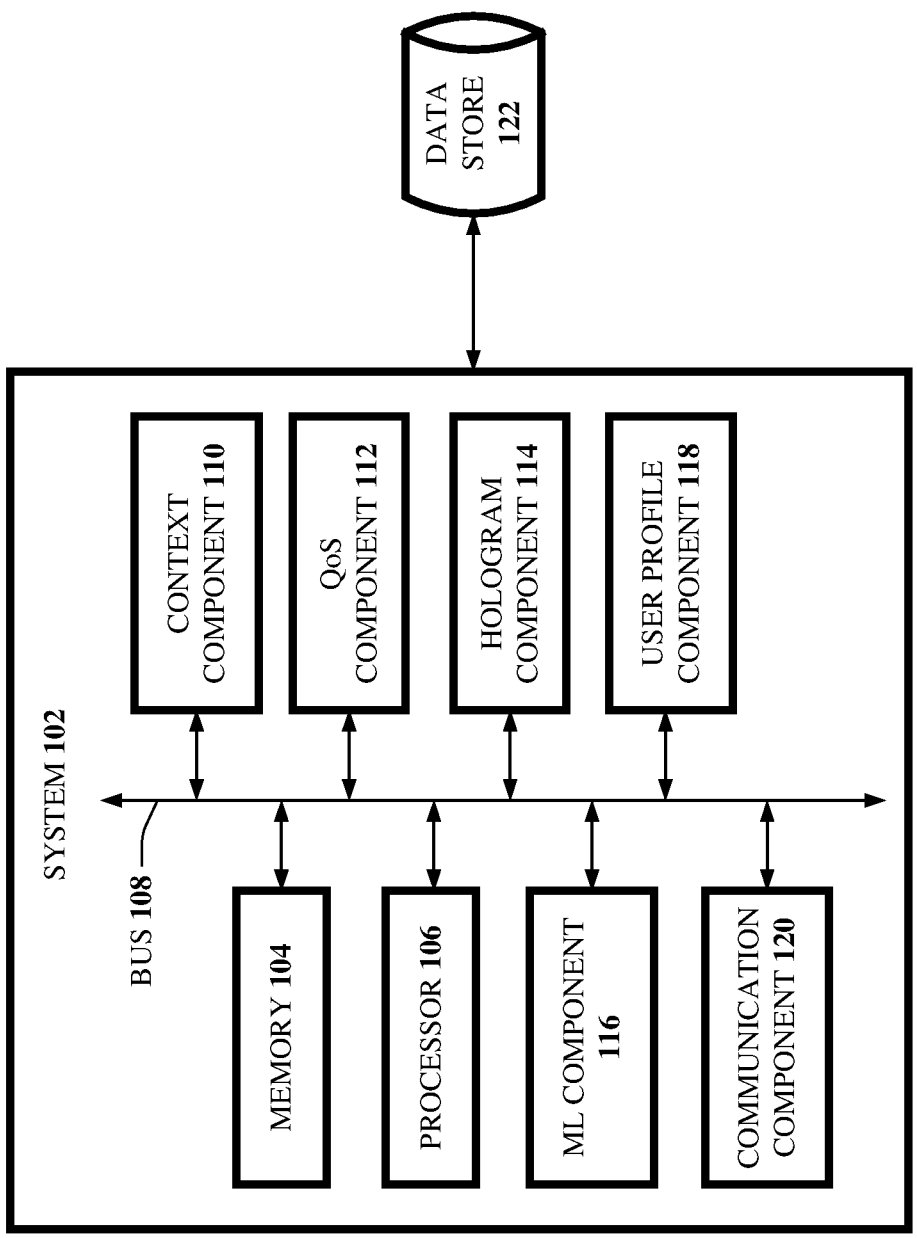
FIG. 1 is a block diagram of an exemplary system in accordance with one or more embodiments described herein.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

As alluded to above, hologram communication continuity can be improved in various ways, and various embodiments are described herein to this end and/or other ends.

Embodiments herein can facilitate hologram projection continuity in weak coverage areas (e.g., weak cellular coverage areas) and/or if a user seeks privacy in association with hologram-based communication. Embodiments herein can synthesize visual animated holographic images using a static "base image" in conjunction with live audio. The synthetic holographic animation can correspond to the holographic subject's environmental setting, along with the audio content and audio-derived emotions (e.g., happy, sad, agitated, or other suitable emotions as later discussed in greater detail).

According to an embodiment, a system can comprise a processor, and a memory that stores executable instructions that, when executed by the processor, facilitate performance of operations, comprising: determining a context associated with a live interaction, wherein the live interaction is associated with a user profile and transmitted via a network, determining quality of service data representative of a quality of service associated with transmission of the live interaction via the network, in response to a quality of service criterion being determined to be threshold satisfied by the quality of service data, generating, using a hologram generation model and based on the context, a synthetic hologram associated with the live interaction, wherein the hologram generation model has been generated based on machine learning applied to past context data representative of past contexts of past live interactions associated with the user profile, from prior to the live interaction, and replacing transmission of the live interaction with the synthetic hologram.

In various embodiments, the synthetic hologram can be representative of a combination of a predicted view of a user associated with the user profile and a base hologram representative of a current view of the user associated with the user profile. In this regard, the live interaction can comprise the base hologram.

In one or more embodiments, the synthetic hologram can be further generated based on a base image modified according to the context.

In additional embodiments, the hologram generation model can be further generated based on the machine learning applied to past live interaction data associated with the past live interactions, and respective past live interaction data can be associated with respective past context data.

In some embodiments, the user profile is a first user profile, the live interaction is between the first user profile and a second user profile, and the synthetic hologram can be further generated based on relationship data representative of a relationship between the first user profile and the second user profile.

In one or more embodiments, the synthetic hologram can be further generated in response to receiving a hologram activation signal indicative of a command to generate and replace the live interaction with the synthetic hologram.

It is noted that the context can be associated with environmental data representative of an environment associated with the live interaction. In additional embodiments, the context can be associated with emotional state data representative of an emotional state of a user associated with the user profile. In further embodiments, the context can be associated with conversation data representative of a conversation from the live interaction.

In various embodiments, the operations can further comprise: in response to replacing the transmission of the live interaction with the synthetic hologram, determining whether the quality of service data no longer threshold satisfies the quality of service criterion, and in response to a determination that the quality of service data no longer threshold satisfies the quality of service criterion, replacing the synthetic hologram with the live interaction.

In another embodiment, a non-transitory machine-readable medium can comprise executable instructions that, when executed by a processor, facilitate performance of operations, comprising: determining a context associated with a live interaction, wherein the live interaction is associated with a user profile and transmitted via a network, determining privacy data representative of a privacy preference associated with the user profile and associated with the context, in response to a privacy criterion being determined to be threshold satisfied by the privacy data, generating, using a hologram generation model and based on the context, a synthetic hologram associated with the live interaction, wherein the hologram generation model has been generated based on machine learning applied to past context data representative of past contexts of past live interactions associated with the user profile, from prior to the live interaction, and replacing transmission of the live interaction with the synthetic hologram.

In various embodiments, the synthetic hologram can be representative of a combination of a predicted view of a user associated with the user profile and a base hologram representative of a current view of the user associated with the user profile, and the live interaction can comprise the base hologram.

It is noted that, in some embodiments, the predicted view can comprise a background determined to be associated with the context. In additional embodiments, the predicted view can comprise clothing of the user determined to be associated with the context. In further embodiments, the predicted view comprises a facial expression of the user determined to be associated with the context.

According to yet another embodiment, a method can comprise determining, by a device comprising a processor, a context associated with a live interaction, wherein the live interaction is associated with a user profile and transmitted via a network, determining, by the device, hardware data representative of hardware associated with transmission of the live interaction via the network, in response to a hardware criterion being determined to be threshold satisfied by the hardware data, generating, by the device, using a hologram generation model and based on the context, a synthetic hologram associated with the live interaction, wherein the hologram generation model has been generated based on machine learning applied to past context data representative of past contexts of past live interactions associated with the user profile, from prior to the live interaction, and transmitting, by the device, the synthetic hologram instead of the live interaction.

In various embodiments, the synthetic hologram can be representative of a combination of a predicted view of a user associated with the user profile and a base hologram representative of a current view of the user associated with the user profile. In this regard, the live interaction can comprise the base hologram.

In one or more embodiments, determining the hardware data can comprise determining that the hardware comprises a two-dimensional camera. In further embodiments, determining the hardware data can comprise determining that the hardware comprises a mobile device (e.g., a smartphone, tablet, computer, wearable, or other suitable mobile device).

In some embodiments, the transmission of the live interaction via the network can comprise an end-to-end encrypted transmission (e.g., using blockchain encryption, symmetric encryption, asymmetric encryption, triple data encryption algorithm, advanced encryption standard, Blowfish, Twofish, format preserving encryption, or other suitable encryption).

It should be appreciated that additional manifestations, configurations, implementations, protocols, etc. can be utilized in connection with the following components described herein or different/additional components as would be appreciated by one skilled in the art.

Turning now to FIG. 1, there is illustrated an example, non-limiting system 102 in accordance with one or more embodiments herein. System 102 can comprise a computerized tool, which can be configured to perform various operations relating to hologram communication continuity. The system 102 can comprise one or more of a variety of components, such as memory 104, processor 106, bus 108, context component 110, quality of service (QoS) component 112, hologram component 114, machine learning (ML) component 116, user profile component 118, and/or communication component 120. Additionally, the system 102 can be communicatively coupled to (or can comprise) data store 122.

In various embodiments, one or more of the memory 104, processor 106, bus 108, context component 110, QoS component 112, hologram component 114, ML component 116, user profile component 118, communication component 120, and/or data store 122 can be communicatively or operably coupled (e.g., over a bus or wireless network) to one another to perform one or more functions of the system 102.

According to an embodiment, the context component 110 can determine a context associated with a live interaction. In this regard, the live interaction can be associated with a user profile and transmitted via a network (e.g., a cellular network). According to an example, the user profile component 118 can store user profile information in the data store 122 or other suitable data storage.

It is noted that the contexts herein can comprise one or more of a variety of contexts. For example, a context herein can be associated with environmental data representative of an environment associated with the live interaction. Such an environment can comprise an outdoor environment such as a park, an indoor environment such as a building interior, a work environment such as an office, factory, or mobile workstation, a home or personal environment such as a house or apartment, or another suitable environment.

In another example, said context can be associated with emotional state data representative of an emotional state of a user associated with the user profile. For instance, an emotional state can comprise one or more of a variety of emotions such as admiration, adoration, aesthetic appreciation, amusement, anxiety, awe, awkwardness, boredom, calmness, confusion, craving, disgust, empathetic pain, entrancement, envy, excitement, fear, horror, interest, joy, nostalgia, romance, sadness, satisfaction, sexual desire, sympathy, triumph, or other suitable emotions associated with a user and/or respective user profile.

In an additional example, context herein can be associated with conversation data representative of a conversation from the live interaction. For instance, the conversation can comprise a debate, dialogue, discourse, and/or diatribe. It is noted that the conversation can be a work conversation (e.g., a professional conversation), a personal conversation (e.g., between friends and/or family), a romantic conversation (e.g., between romantic partners), or another suitable conversation type.

According to an embodiment, the QoS component 112 can determine QoS data representative of a QoS associated with transmission of a live interaction via a network (e.g., a 5G or 6G cellular network). QoS herein can be associated with one or more of a variety of QoS parameters, such as delay time, jitter, end to end delay through put, packet loss, or other suitable QoS parameters. Such parameters can be indicative of a quality of transmission of a live interaction (e.g., three-dimensional holographic video chat/call). In this regard, the three dimensional video chat can comprise live, three dimensional holograms of participants. Poor QoS can be associated with poor transmission of said three dimensional holograms, which can be attributed to slow data speeds and/or a poor data connection. As discussed above, such conditions can exist in areas with poor coverage (e.g., in a rural areas or in a region experiencing network outages) or in dense areas with network congestion (e.g., due to an influx of mobile data users).

According to an embodiment, in response to a QoS criterion (e.g., a QoS parameter) being determined (e.g., by the QoS component 112) to be threshold satisfied by the QoS data, the hologram component 114 can generate, using a hologram generation model and based on the context, a synthetic hologram associated with the live interaction. Such a QoS threshold can comprise one or more minimum values for QoS parameters determined to be minimally sufficient for transmission of live, three dimensional holograms. Such a QoS threshold can be predefined or can be determined, for instance, using machine learning (e.g., via an ML component 116 as later discussed herein). In some embodiments, the QoS thresholds can be stored in a data store 122.

It is noted that a synthetic hologram herein can be representative of a combination of a predicted view (e.g., predicted by an ML component 116) of a user associated with the user profile and a base hologram representative of a current view (e.g., a live view) of the user associated with the user profile. In this regard, the live interaction can comprise the base hologram. Further in this regard, a synthetic hologram can be leveraged in order to supplement a pure, live interaction, for instance, in areas of weak Internet or telecommunication coverage, when privacy concerns or preferences arise, when hardware limitations exist, or under other suitable circumstances.

According to an embodiment, a predicted view herein can comprise a background determined to be associated with a context. For instance, if a context comprises a work or professional environment, the predicted view (e.g., as predicted by an ML component 116) can comprise a background representative of a work environment (e.g., an office or another suitable work setting). In another example, if the context comprises a personal, casual, or romantic environment, a background determined (e.g., by an ML component 116) to be associated with such contexts and can be superimposed over an actual live background. For instance, two users on a virtual date can possess a restaurant as their backgrounds, though they're actually in their own respective homes. In this regard, an actual, live background can be replaced or supplemented with the predicted view or background.

In additional embodiments, a predicted view (e.g., as predicted by an ML component 116) can comprise clothing of the user determined to be associated with the context. For instance, if the context comprises a professional or work environment, a user's casual clothing (e.g., a t-shirt and shorts) can be replaced in the synthetic hologram with professional attire (e.g., a virtual suit). In another example, a user's actual pajamas can be replaced with virtual professional attire during a work meeting. Likewise, if the context comprises a personal, casual, or romantic environment, clothing determined to be associated with such contexts can be superimposed over actual clothing of a user. For instance, if two friends are communicating after work, before changing clothing, their actual, live professional attire can be replaced with virtual casual clothing. In this regard, actual clothing can be replaced or supplemented with clothing determined to be associated with the context.

In further embodiments, a predicted view (e.g., as predicted by an ML component 116) can comprise a facial expression of the user determined to be associated with the context. For instance, if a user profile comprises emotions or facial expressions associated with a given context, a facial expression can be superimposed over an actual facial expression of a user. For example, if a system herein determines that a user enjoys speaking with another user, the system can superimpose a smiling face over an actual facial expression of the user (e.g., if the actual live view of the user appears sad). In another example, facial expressions can be associated with environments, such as a professional environment. For instance, a user's actual, tired appearance can be replaced with an energetic appearance or facial expression during a work call. For example, a tired appearance of a user conducting late evening work call can be replaced with a more energetic appearance.

In various embodiments, a synthetic hologram herein can be further generated based on a base image, modified according to the context. For instance, a base image can comprise a base, three dimensional hologram associated with a user and/or user profile. In this regard, the base three dimensional hologram can be modified according to a context described herein. For example, the base hologram image can comprise a generic view of a user or user profile, which can be adapted or modified according to various contexts herein.

According to an embodiment, the ML component 116 can generate a hologram generation model based on machine learning applied to past context data representative of past contexts of past live interactions associated with the user profile, from prior to the live interaction. In this regard, the user profile component 118 can store such past context data associated with the user profile in the data store 122 for later use by various components, such as the ML component 116. In one or more embodiments, the hologram generation model can be further generated (e.g., by the ML component 116) based on the machine learning applied to past live interaction data associated with the past live interactions. In this regard, respective past live interaction data can be associated with respective past context data.

In an embodiment, the user profile herein can comprise a first user profile, a live interaction herein can be between the first user profile and a second user profile, and the synthetic hologram can be further generated based on relationship data representative of a relationship between the first user profile and the second user profile. According to an embodiment, aspects of a synthetic hologram herein can be catered based on the relationship between the first user profile and the second user profile. For example, if respective users of the first user profile and second user profile are parties to a romantic relationship, background lighting could be adjusted accordingly, or a background could be adjusted to a suitable background, such as a romantic stroll on a beach. In another example, if respective users of the first user profile and second user profile maintain a professional relationship, suitable clothing (e.g., professional attire) can be implemented in the synthetic hologram to replace actual, casual clothing of the first and/or second user.

According to an embodiment, the ML component 116 can learn how a user associated with a user profile moves and gestures during various situations, moods, time of day, or related events (e.g., personal events or global events such as elections, natural disasters in a region, or other suitable events). The ML component 116 can thereby analyze speech and determine a correlation between a topic of conversation, and how a user's facial expression appears. Prior facial expression(s) (e.g., as stored in a data store 122) can be referenced in conjunction with the user's emotion. In this regard, a context component 110 or ML component 116 can thereby analyze an emotional situation and cause the hologram component 114 to project a corresponding facial expression or emotion. In another embodiment, the ML component 116 can learn how a user talks to others (e.g., a work manager, friend, spouse, parent, child, pet, or another suitable recipient) and determine movements and mannerisms the hologram component 114 should project, so that the projected image corresponds to not only the emotional state, but also the viewer's respective, personal relationship to the user. For example, if the context component 110 or ML component 116 detects or determines that a user possesses a happy voice inflection, said emotion can be represented in a synthetic hologram representation (e.g., in areas where there is only basic camera hardware or a slow data connection, such in a park). In this regard, if the context component 110 or ML component 116 detects or determines that a user is happy, sad, agitated, or exhibiting another suitable emotion, the hologram component 114 can modify the synthetic hologram image accordingly. User appearance can also vary by way of clothing, shaven, hairstyle, or other suitable appearance factors, depending on whether communication with is being conducted with work colleagues, family, friends, or others. For example, a user's more casual appearance can be modified in the synthetic hologram to appear more professional during a work call. Additionally, an environment can be indicative of the user's preference (e.g., house tidy vs. disorganized).

According to an embodiment, if, the ML component 116 determines that a user will become agitated or upset in response to some aspect of the communication, the ML component 116 can cause the hologram component 114 to suppress agitated hologram displays. For example, if in a user's past several interactions with a particular person, the user became very upset, a system herein can suppress certain emotions so an agitated holographic image (e.g., showing the middle finger) is not conveyed (e.g., intentionally, or accidentally) when contacting the particular person again. According to an embodiment, such suppressions, however, can be user-overridden. For example, a user can find it important to show a middle finger to a particular person, and thus override such suppressions by a system herein. In this regard, certain default behaviors can be utilized, and users can modify their own respective user profiles according to user preferences. Additionally, different cultures and nationalities can have varying levels of acceptability of certain gestures or phrases, so automatic suppressions herein can be culturally catered.

According to an embodiment, the ML component 116 can access a user's chat messages, call history, emails, text messages, or other suitable communication data associated with a user profile herein. In this regard, the ML component 116 can analyze past experiences of a user regarding topic being discussed, of another party on a call, circumstances, time of day, or other suitable factors. The ML component 116 can determine progress of the relationship between the user and the other party and a goal of the current call, and can cause the hologram component 114 to accordingly adjust the gestures of the projected hologram. It is noted that a user profile can be associated with various data (e.g., stored in a data store 122), such as past images showing clothing or hairstyle. A user profile can also be associated with past video showing emotional states. The foregoing can be utilized (e.g., by the ML component 116) in order to determine how to adapt or tune a synthetic hologram herein with respect to various like-situations or circumstances.

It is noted that machine learning herein can be local and/or global. In this regard, with respect to local learning, for instance, the ML component 116 can learn a specific user's routine (e.g., when to appear professional). For example, if a user becomes very angry at pizza delivery person, the ML component 116 can learn to determine to protect a user (e.g., protect a user from embarrassment or from causing self-reputational harm) by filtering profanity. This way, the next time that the pizza delivery person is late, extreme emotions by the user can be filtered and hidden by replacing appearance of such in a synthetic hologram with a tamer emotional appearance.

With respect to global learning, for instance, the ML component 116 can collect information and generate universally acceptable (e.g., universally agreed-upon) behaviors. For instance, the ML component 116 can determine that most profanity is universally undesirable. For example, if a participant to a holographic call is determined to be discussing a contentious subject, and people in the same geographical region are determined to be upset about the contentious subject, the ML component 116 can predict that the conversion could become hostile. Global learning can change with time, global or regional events, backgrounds, or other suitable factors, and can thus be geo-specific.

Various embodiments herein can employ artificial-intelligence or machine learning systems and techniques to facilitate learning user behavior, context-based scenarios, preferences, etc. in order to facilitate taking automated action with high degrees of confidence. Utility-based analysis can be utilized to factor benefit of taking an action against cost of taking an incorrect action. Probabilistic or statistical-based analyses can be employed in connection with the foregoing and/or the following.

It is noted that systems and/or associated controllers, servers, or machine learning components herein can comprise artificial intelligence component(s) which can employ an artificial intelligence (AI) model and/or ML or an ML model that can learn to perform the above or below described functions (e.g., via training using historical training data and/or feedback data).

In some embodiments, ML component 116 can comprise an AI and/or ML model that can be trained (e.g., via supervised and/or unsupervised techniques) to perform the above or below-described functions using historical training data comprising various context conditions that correspond to various augmented network optimization operations. In this example, such an AI and/or ML model can further learn (e.g., via supervised and/or unsupervised techniques) to perform the above or below-described functions using training data comprising feedback data, where such feedback data can be collected and/or stored (e.g., in memory) by the ML component 116. In this example, such feedback data can comprise the various instructions described above/below that can be input, for instance, to a system herein, over time in response to observed/stored context-based information.

AI/ML components herein can initiate an operation(s) associated with a based on a defined level of confidence determined using information (e.g., feedback data). For example, based on learning to perform such functions described above using feedback data, performance information, and/or past performance information herein, an ML component 116 herein can initiate an operation associated with determining various thresholds herein (e.g., a QoS threshold, a privacy threshold, a hardware threshold, or another suitable threshold).

In an embodiment, the ML component 116 can perform a utility-based analysis that factors cost of initiating the above-described operations versus benefit. In this embodiment, the ML component 116 can use one or more additional context conditions to determine various thresholds herein.

To facilitate the above-described functions, a ML component 116 herein can perform classifications, correlations, inferences, and/or expressions associated with principles of artificial intelligence. For instance, the ML component 116 can employ an automatic classification system and/or an automatic classification. In one example, the ML component 116 can employ a probabilistic and/or statistical-based analysis (e.g., factoring into the analysis utilities and costs) to learn and/or generate inferences. The ML component 116 can employ any suitable machine-learning based techniques, statistical-based techniques and/or probabilistic-based techniques. For example, the ML component 116 can employ expert systems, fuzzy logic, support vector machines (SVMs), Hidden Markov Models (HMMs), greedy search algorithms, rule-based systems, Bayesian models (e.g., Bayesian networks), neural networks, other non-linear training techniques, data fusion, utility-based analytical systems, systems employing Bayesian models, and/or the like. In another example, the ML component 116 can perform a set of machine-learning computations. For instance, the ML component 116 can perform a set of clustering machine learning computations, a set of logistic regression machine learning computations, a set of decision tree machine learning computations, a set of random forest machine learning computations, a set of regression tree machine learning computations, a set of least square machine learning computations, a set of instance-based machine learning computations, a set of regression machine learning computations, a set of support vector regression machine learning computations, a set of k-means machine learning computations, a set of spectral clustering machine learning computations, a set of rule learning machine learning computations, a set of Bayesian machine learning computations, a set of deep Boltzmann machine computations, a set of deep belief network computations, and/or a set of different machine learning computations.

According to an embodiment, the communication component 120 can replace transmission of a live holographic interaction with a synthetic hologram. In this regard, broadcasting of a live, actual transmission of a three dimensional hologram (e.g., of a user) can be replaced with a synthetic hologram of said user. In some embodiments, in response to replacing the transmission of the live interaction with the synthetic hologram, the QoS component 112 can determine whether the QoS data no longer threshold satisfies the QoS criterion, and in response to a determination by the QoS component 112 that the QoS data no longer threshold satisfies the QoS criterion, the hologram component 114 can replace the synthetic hologram with the live interaction. It is noted that the communication component 120 can comprise the hardware required to implement a variety of communication protocols (e.g., infrared ("IR"), shortwave transmission, near-field communication ("NFC"), Bluetooth, Wi-Fi, long-term evolution ("LTE"), 3G, 4G, 5G, 6G, global system for mobile communications ("GSM"), code-division multiple access ("CDMA"), satellite, visual cues, radio waves, etc.)

Figure 2:
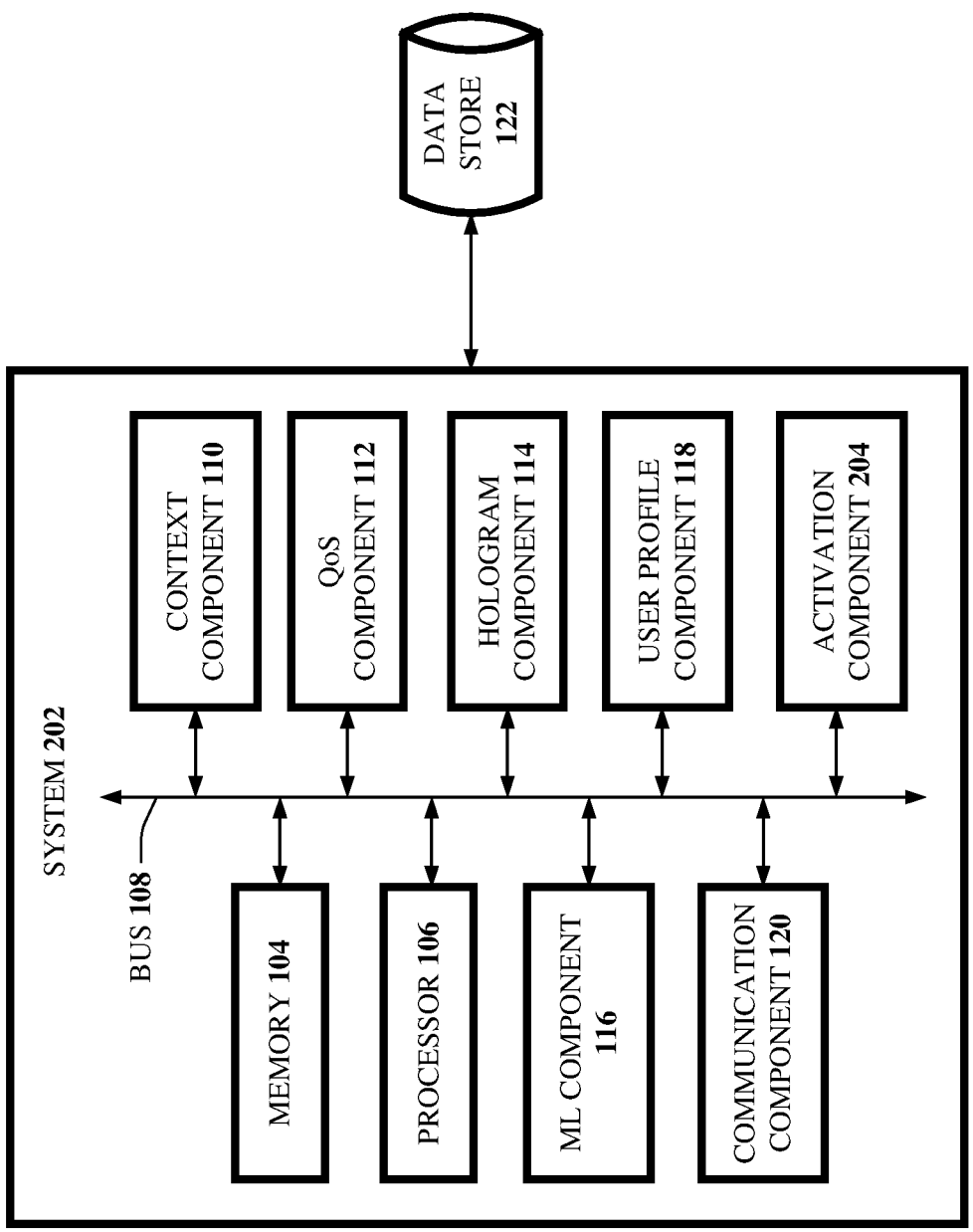
FIG. 2 is a block diagram of an exemplary system in accordance with one or more embodiments described herein.

Turning now to FIG. 2, there is illustrated an example, non-limiting system 202 in accordance with one or more embodiments herein. System 202 can comprise a computerized tool, which can be configured to perform various operations relating to hologram communication continuity. The system 202 can be similar to system 102, and can comprise one or more of a variety of components, such as memory 104, processor 106, bus 108, context component 110, QoS component 112, hologram component 114, ML component 116, user profile component 118, and/or communication component 120. It is noted that the system 202 can be communicatively coupled to (or can comprise) data store 122. The system 202 can additionally comprise an activation component 204.

In various embodiments, one or more of the memory 104, processor 106, bus 108, context component 110, QoS component 112, hologram component 114, ML component 116, user profile component 118, communication component 120, data store 122, and/or activation component 204 can be communicatively or operably coupled (e.g., over a bus or wireless network) to one another to perform one or more functions of the system 202.

According to an embodiment, a synthetic hologram herein can be further generated (e.g., using the hologram component 114) in response to receiving a hologram activation signal (e.g., by the activation component 204 via the communication component 120) indicative of a command (e.g., from a user or another entity) to generate and replace the live interaction with the synthetic hologram. In this regard, the synthetic hologram can be enabled to be generated in response to receiving an activation signal from a user. According to an embodiment a user can enable the synthetic hologram according to a user preference. In other embodiments, such a hologram activation signal can be received from other entities. For instance, a hologram can be received (e.g., by the activation component 204 via the communication component 120) from a manager (e.g., a user's boss) of a user associated with a live hologram, and the live hologram can be replaced with the synthetic hologram in response to receiving the activation signal from the manager. In another example, a corporate policy can require use of synthetic holograms after a certain time of day (e.g., to maintain professional appearance). In this regard, such a hologram activation signal can be received from a corporate management device associated with a user's office.

Figure 3:
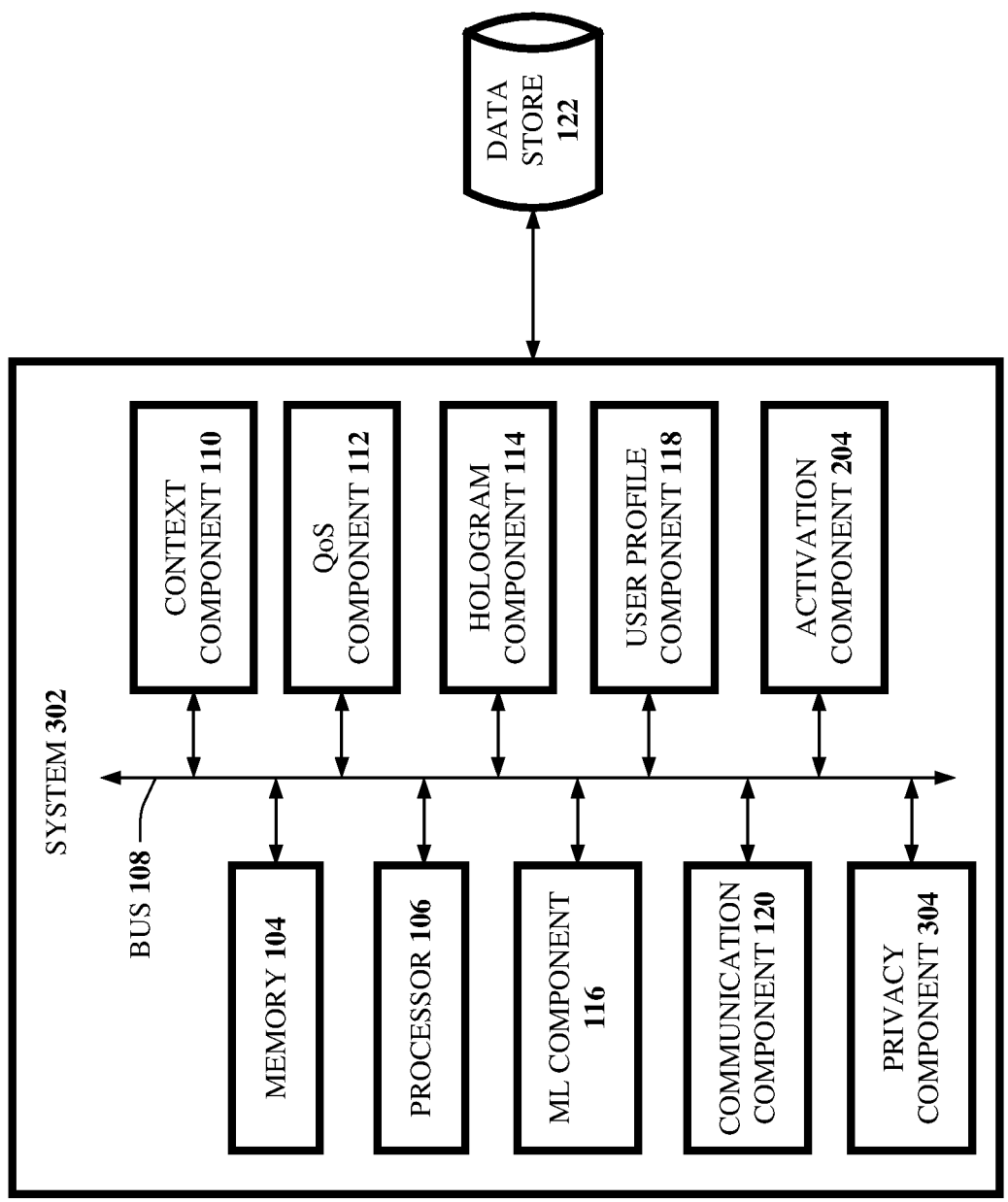
FIG. 3 is a block diagram of an exemplary system in accordance with one or more embodiments described herein.

Turning now to FIG. 3, there is illustrated an example, non-limiting system 302 in accordance with one or more embodiments herein. System 302 can comprise a computerized tool, which can be configured to perform various operations relating to hologram communication continuity. The system 302 can be similar to system 202, and can comprise one or more of a variety of components, such as memory 104, processor 106, bus 108, context component 110, QoS component 112, hologram component 114, ML component 116, user profile component 118, communication component 120, and/or activation component 204. It is noted that the system 302 can be communicatively coupled to (or can comprise) data store 122. The system 302 can additionally comprise a privacy component 304.

In various embodiments, one or more of the memory 104, processor 106, bus 108, context component 110, QoS component 112, hologram component 114, ML component 116, user profile component 118, communication component 120, data store 122, activation component 204, and/or privacy component 304 can be communicatively or operably coupled (e.g., over a bus or wireless network) to one another to perform one or more functions of the system 302.

According to an embodiment, the privacy component 304 can determine privacy data representative of a privacy preference associated with the user profile and/or associated with the context. According to an embodiment, such a privacy preference or criterion can comprise a corporate dress code, video background policy, user/user profile preference, quantity or type of participants on the associated call, or another suitable criterion. In some embodiments, privacy preferences can be determined using machine learning (e.g., using the ML component 116) associated with a user profile and/or context. In this regard, in response to a privacy criterion being determined (e.g., by the privacy component 304) to be threshold satisfied by the privacy data, the hologram component 114 can generate (e.g., using a hologram generation model and/or based on a context), a synthetic hologram associated with a live interaction. Consequently, transmission of the live interaction can be replaced (e.g., using the communication component 120) with the synthetic hologram.

Figure 4:
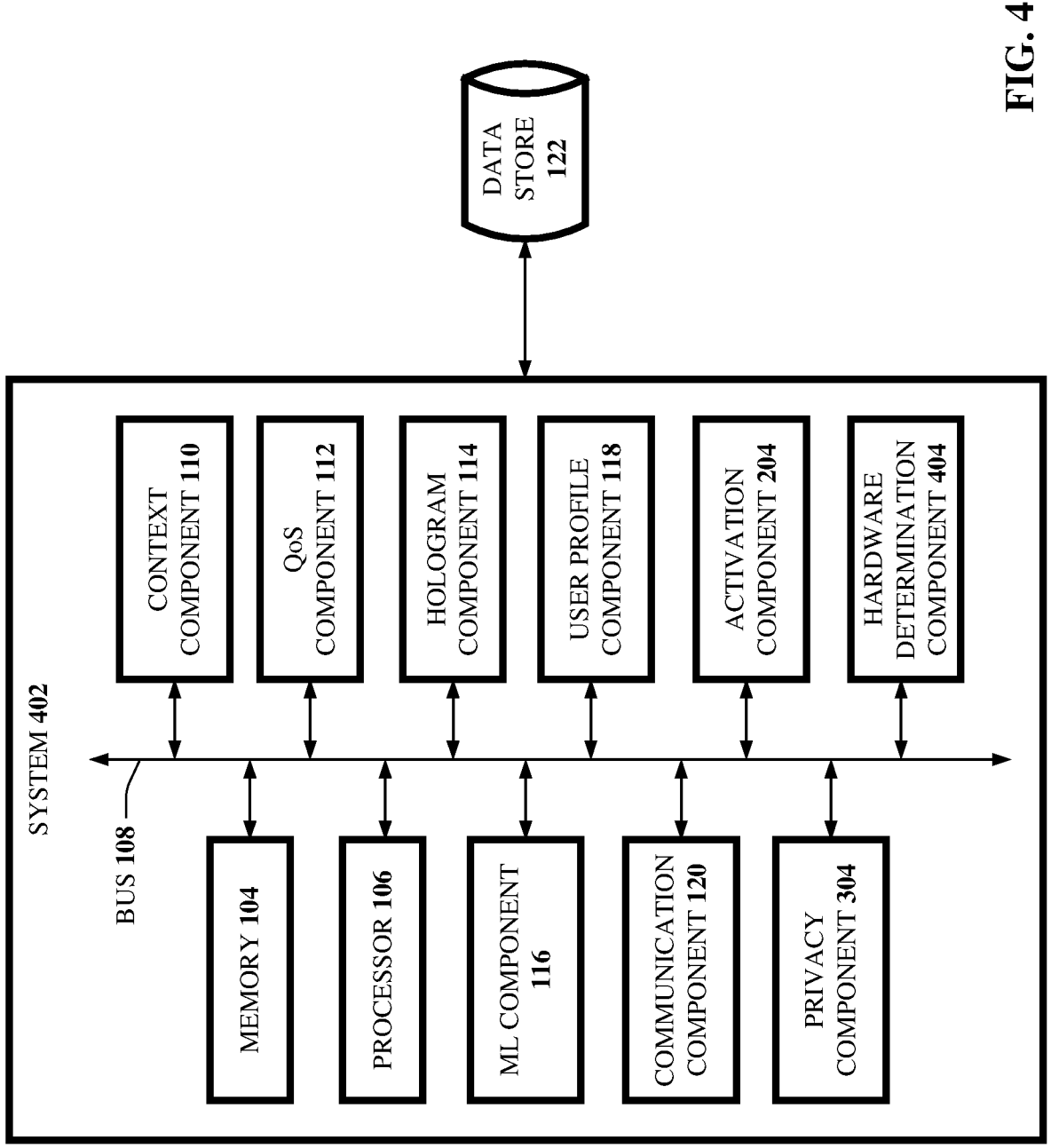
FIG. 4 is a block diagram of an exemplary system in accordance with one or more embodiments described herein.

Turning now to FIG. 4, there is illustrated an example, non-limiting system 402 in accordance with one or more embodiments herein. System 402 can comprise a computerized tool, which can be configured to perform various operations relating to hologram communication continuity. The system 402 can be similar to system 302, and can comprise one or more of a variety of components, such as memory 104, processor 106, bus 108, context component 110, QoS component 112, hologram component 114, ML component 116, user profile component 118, communication component 120, activation component 204, and/or privacy component 304. It is noted that the system 402 can be communicatively coupled to (or can comprise) data store 122. The system 402 can additionally comprise a hardware determination component 404

In various embodiments, one or more of the memory 104, processor 106, bus 108, context component 110, QoS component 112, hologram component 114, ML component 116, user profile component 118, communication component 120, data store 122, activation component 204, privacy component 304, and/or hardware determination component 404 can be communicatively or operably coupled (e.g., over a bus or wireless network) to one another to perform one or more functions of the system 402.

According to an embodiment, the hardware determination component 404 can determine hardware data representative of hardware associated with transmission of the live interaction via the network. In this regard, in response to a hardware criterion being determined (e.g., using the hardware determination component 404) to be threshold satisfied by the hardware data, the hologram component 114 can generate, using a hologram generation model and based on the context, a synthetic hologram associated with the live interaction. Consequently, the synthetic hologram can be transmitted (e.g., via the communication component 120) instead of the live interaction. It is noted that determining the hardware data can comprise determining that the hardware comprises a two-dimensional camera. In this regard, the two-dimensional camera can be insufficient for image capture required for a three-dimensional hologram, and the hologram component 114 can thus generate a three dimensional synthetic hologram based on the two-dimensional image captured from the two-dimensional camera or from a base image (e.g., stored in the data store 122). It is additionally noted that determining the hardware data can comprise determining that the hardware comprises a mobile device not capable of three-dimensional image capture for use in generation of a live hologram. It is noted that such hardware data herein can be representative of one or more components or capabilities or any respective hardware (e.g., processing power, available memory, peripheral support, networking support, cameras available, camera types, microphones, speakers, projectors, or other suitable hardware data).

Figure 5:
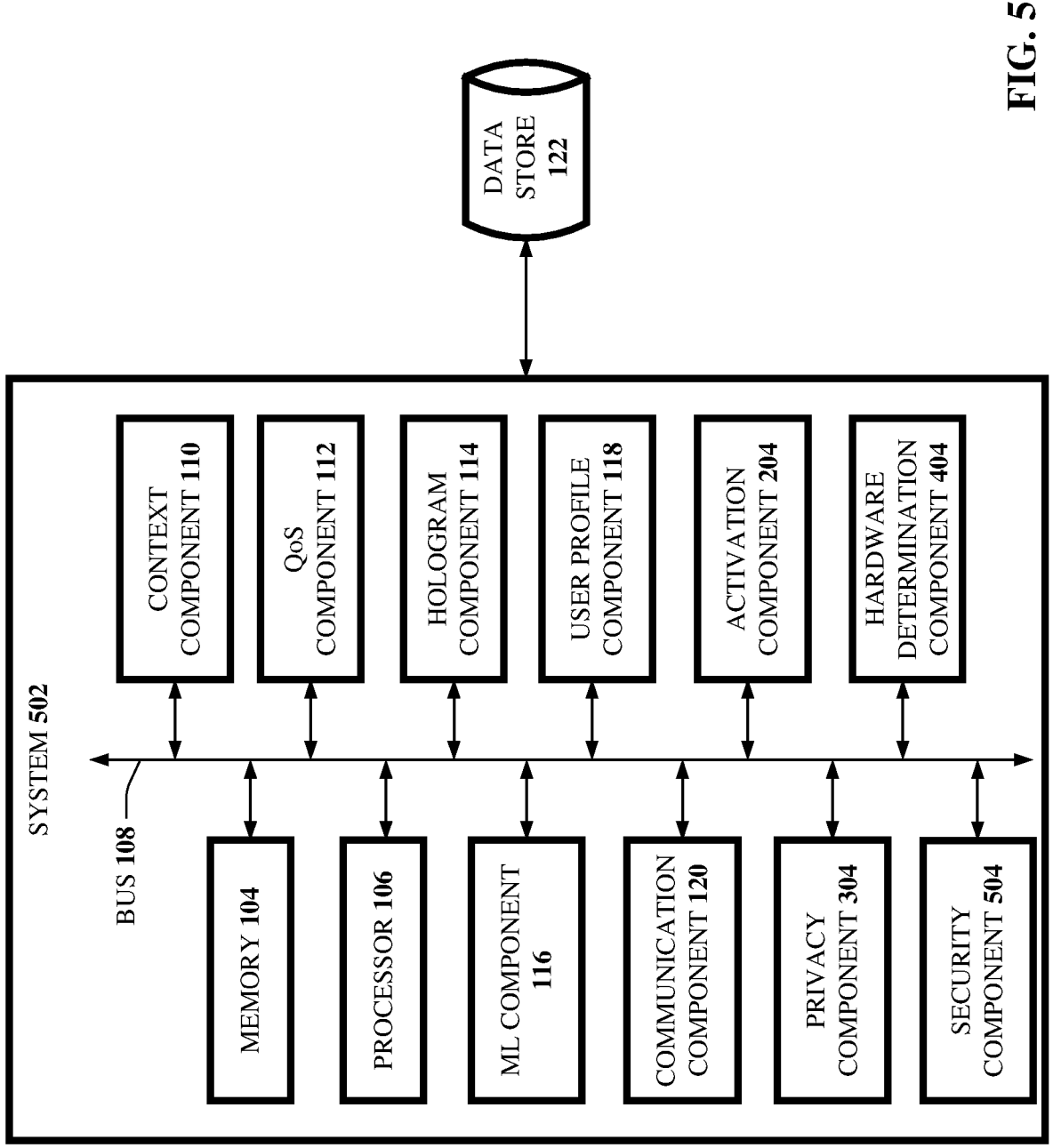
FIG. 5 is a block diagram of an exemplary system in accordance with one or more embodiments described herein.

Turning now to FIG. 5, there is illustrated an example, non-limiting system 502 in accordance with one or more embodiments herein. System 502 can comprise a computerized tool, which can be configured to perform various operations relating to hologram communication continuity. The system 502 can be similar to system 402, and can comprise one or more of a variety of components, such as memory 104, processor 106, bus 108, context component 110, QoS component 112, hologram component 114, ML component 116, user profile component 118, communication component 120, activation component 204, privacy component 304, and/or hardware determination component 404. It is noted that the system 502 can be communicatively coupled to (or can comprise) data store 122. The system 502 can additionally comprise a security component 504.

In various embodiments, one or more of the memory 104, processor 106, bus 108, context component 110, QoS component 112, hologram component 114, ML component 116, user profile component 118, communication component 120, data store 122, activation component 204, privacy component 304, hardware determination component 404, and/or security component 504 can be communicatively or operably coupled (e.g., over a bus or wireless network) to one another to perform one or more functions of the system 502.

According to an embodiment, the security component 504 can facilitate end-to-end encryption of transmission of a live interaction (e.g., of a live three dimensional hologram) via a network. Similarly, the security component 504 can facilitate end-to-end encryption of transmission of a synthetic hologram herein (e.g., a synthetic three dimensional hologram) over a network (e.g., a 5G or 6G cellular network). It is noted that the security component 504 can enable cryptographic validation that a user generating a respective hologram is actually associated with a respective user profile (e.g., the user generating the hologram is "who they say they are"). In this regard, transmission of a "spoofed" hologram can be avoided, which can be critical in eliciting trust of participants in the deployment of synthetic holograms herein.

In some embodiments, a certified user (e.g., law enforcement personnel) can be enabled to appear as an alternate person. For example, a law enforcement member can be enabled to pose as a minor in order to help catch a child abuser or a sexual predator.

Figure 6:
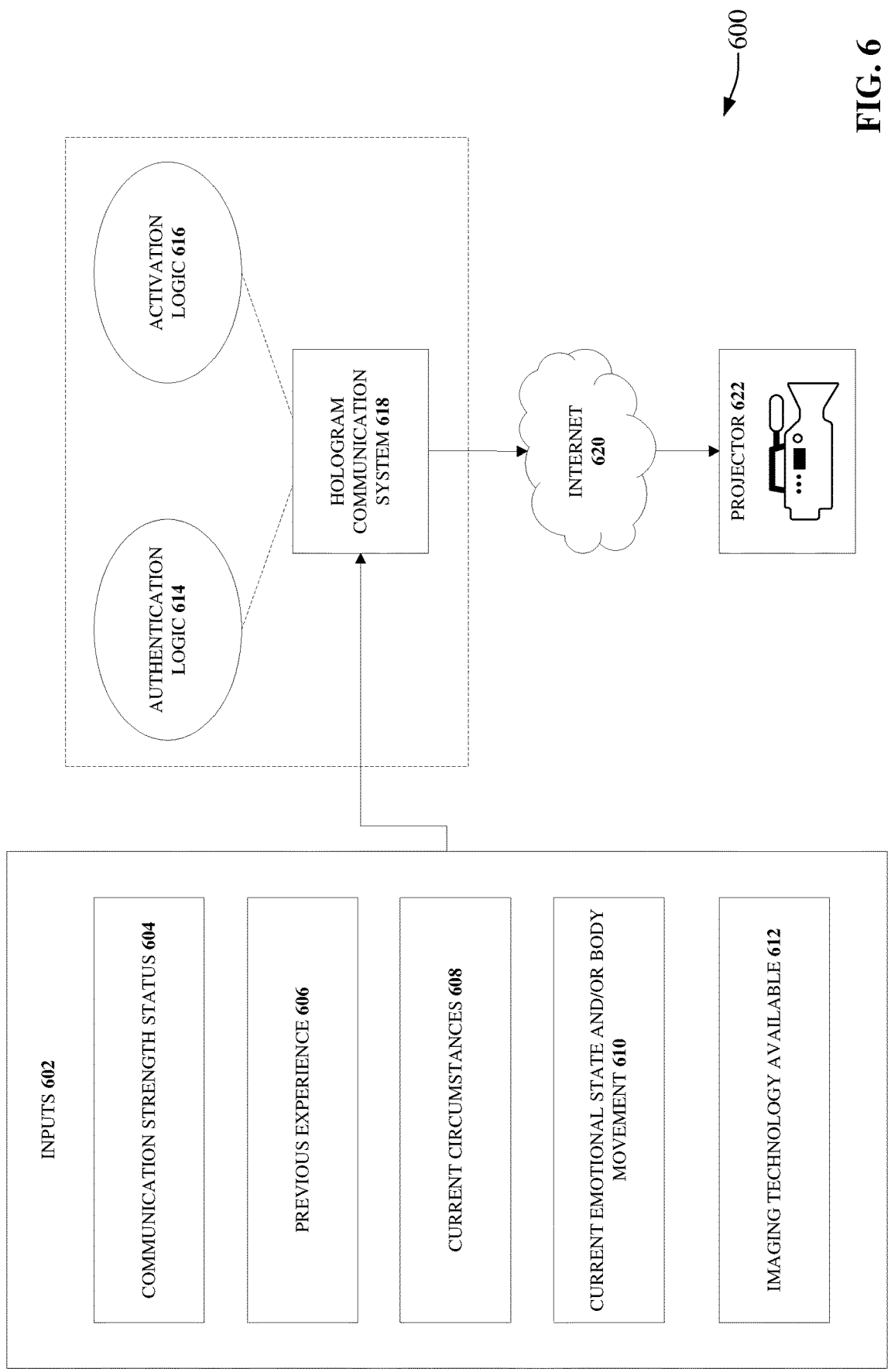
FIG. 6 is a diagram of exemplary system architecture in accordance with one or more embodiments described herein.

FIG. 6 illustrates exemplary system architecture 600 in accordance with one or more embodiments described herein. According to an embodiment, the hologram communication system 618 can be similar to one or more of systems 102, 202, 304, 402, and/or 502.

Inputs 602 can comprise one or more of communication strength status 604, previous experience 606, current circumstances 608, current emotional state and/or body movement 610, imaging technology available 612, or other suitable inputs. The hologram communication system 618 can utilize inputs 602 in order to determine whether to replace a live transmission with a synthetic hologram herein. According to an embodiment, communication strength status 604 can be representative of a QoS parameter, such as delay time, jitter, end to end delay through put, packet loss, or other suitable QoS parameters. Such communication can be carried, for instance, over a 4G, 5G, or 6G network, or another suitable network. Previous experience 606 can be representative of a correlation between topic and body movement. In this regard, a context herein, such as a topic of conversation, can be correlated with one or more body movements of a user profile associated with a user. For example, historical capture of past body language or gestures (e.g., how a user laughs or gestures when speaking) can be associated with a user profile herein. In this regard, when a synthetic hologram associated with that user profile is generated, it can be consistent with normal gestures or movements of that user based on prior experience (e.g., as determined by an ML component 116). Prior facial expressions can be utilized (e.g., by an ML component 116) as a reference point based on prior imaging for use with a similar emotional states that should have a similar kind of appearance applied to the synthetic image. Current circumstances 608 can be representative of a current location of a user, topic of conversation, called-party relationship to calling-party, environment (e.g., indoor or outdoor setting), or other suitable circumstances. Current emotional state and/or body movement 610 can be representative of a predicted emotional state or a body movement of a participant in a holographic video call. For instance, whether a user is determined (e.g., by an ML component 116 or context component 110) to be happy, sad, telling jokes, or how a user is otherwise behaving can be utilized in the generation of a synthetic holographic image. Imaging technology available 612 can be associated with hardware data herein, representative of hardware associated with transmission of the live interaction via a network. For example, imaging technology available 612 can be representative of an availability of cameras in an environment (e.g., an office, a house, a studio, an outdoor metro park, or another suitable environment) employable for capturing images for use in three-dimensional live holographic data. For example, some smartphones are only capable of two dimensional image capture, and are thus not alone capable of capturing images sufficient for use in generation of a three dimensional holographic image. Thus, a synthetic hologram can be generated, for instance (e.g., by a hologram component 114), based on image(s) or video captured by said smartphone or based on a base image.

Authentication logic 614 can be facilitated by the hologram communication system 618 and can comprise cryptographic validation (e.g., using the privacy component 504) that a user generating the hologram is actually associated with a respective user profile (e.g., the user generating the hologram is "who they say they are"). In this regard, a "spoofed" hologram can be avoided. In this regard, digital cryptographic attestation can be enabled (e.g., by the privacy component 504) to certify authenticity of a synthetic hologram. For example, public cryptography can be utilized by the privacy component 504 to validate holographic data herein.

Activation logic 616 can be facilitated by the hologram communication system 618 and can comprise a verbal activation command (e.g., received using the activation component 204 via the communication component 120) or an automatic activation. For instance, an automatic activation can be preconfigured to occur or intelligently determined (e.g., using ML component 116) to occur based on one or more various circumstances. In other embodiments, machine learning (e.g., using the ML component 116) can be employed to leverage a predictive model in order to determine when the hologram communication system 618 should be activated.

The hologram communication system 618 can transmit synthetic hologram information over the internet 620 (e.g., using a wired or wireless connection such as Wi-Fi, 4G, 5G, 6G, or another suitable communication technology). A hologram projector 622 can be configured to project a hologram of a user at a location associated with a user/party.

Figure 7:
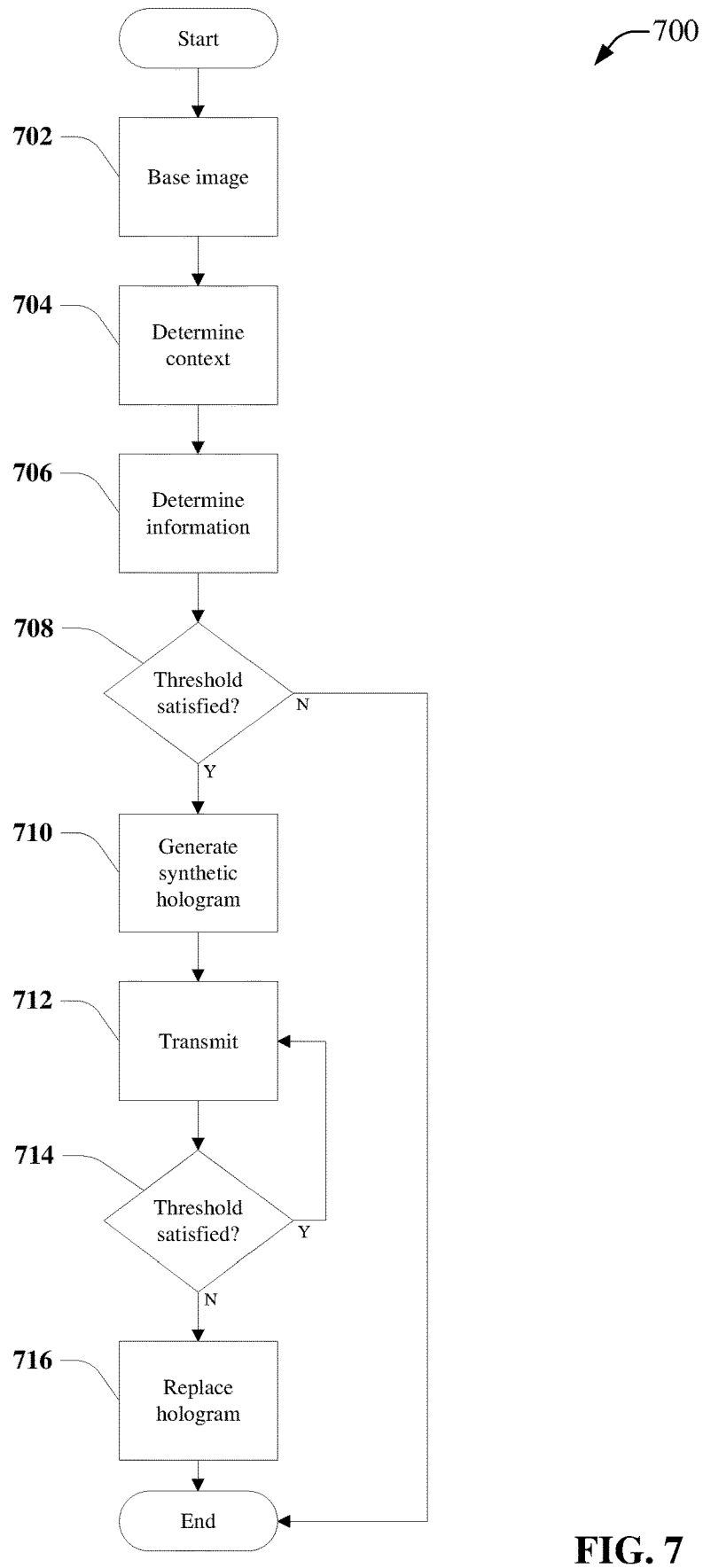
FIG. 7 is a flowchart for a process associated with hologram communication continuity in accordance with one or more embodiments described herein.

Turning now to FIG. 7, there is illustrated a flow chart of a process 700 relating to hologram communication continuity in accordance with one or more embodiments described herein. At 702 a base image can be received (e.g., via a communication component 120) or determined (e.g., using ML component 116 from a data store 122 containing one or more base images). In this regard, a user profile component can receive and/or store base images associated with respective user profiles of users of a system herein. At 704, context associated with a live interaction can be determined (e.g., by a context component 110). At 706, other information can be determined. For instance, such other information can comprise QoS data, privacy data, hardware data, or other suitable other information. At 708, the other information can be compared to an associated threshold (e.g., a QoS threshold, a privacy threshold, a hardware threshold, or another suitable threshold). If the threshold is determined to be satisfied by the other information, the process 700 can proceed to 710. If the threshold is not satisfied by the other information, the process 700 can end (or repeat, for instance, by returning to 702). At 710, a synthetic hologram can be generated (e.g., using a hologram component 114). At 712, the synthetic hologram can be transmitted (e.g., via a communication component 120) to a recipient of the synthetic hologram (e.g., a participant in a hologram video call). At 714, the other information can be, again, compared to an associated threshold. If the threshold is determined to be satisfied by the other information at 714, the process 700 can return to 712. If the threshold is no longer satisfied by the other information, the process 700 can proceed to 716. At 716, the synthetic hologram can be replaced with the live interaction. In this regard, transmission of the synthetic hologram can end, and transmission of a live interaction (e.g., a three dimensional live hologram) can commence or resume.

Figure 8:
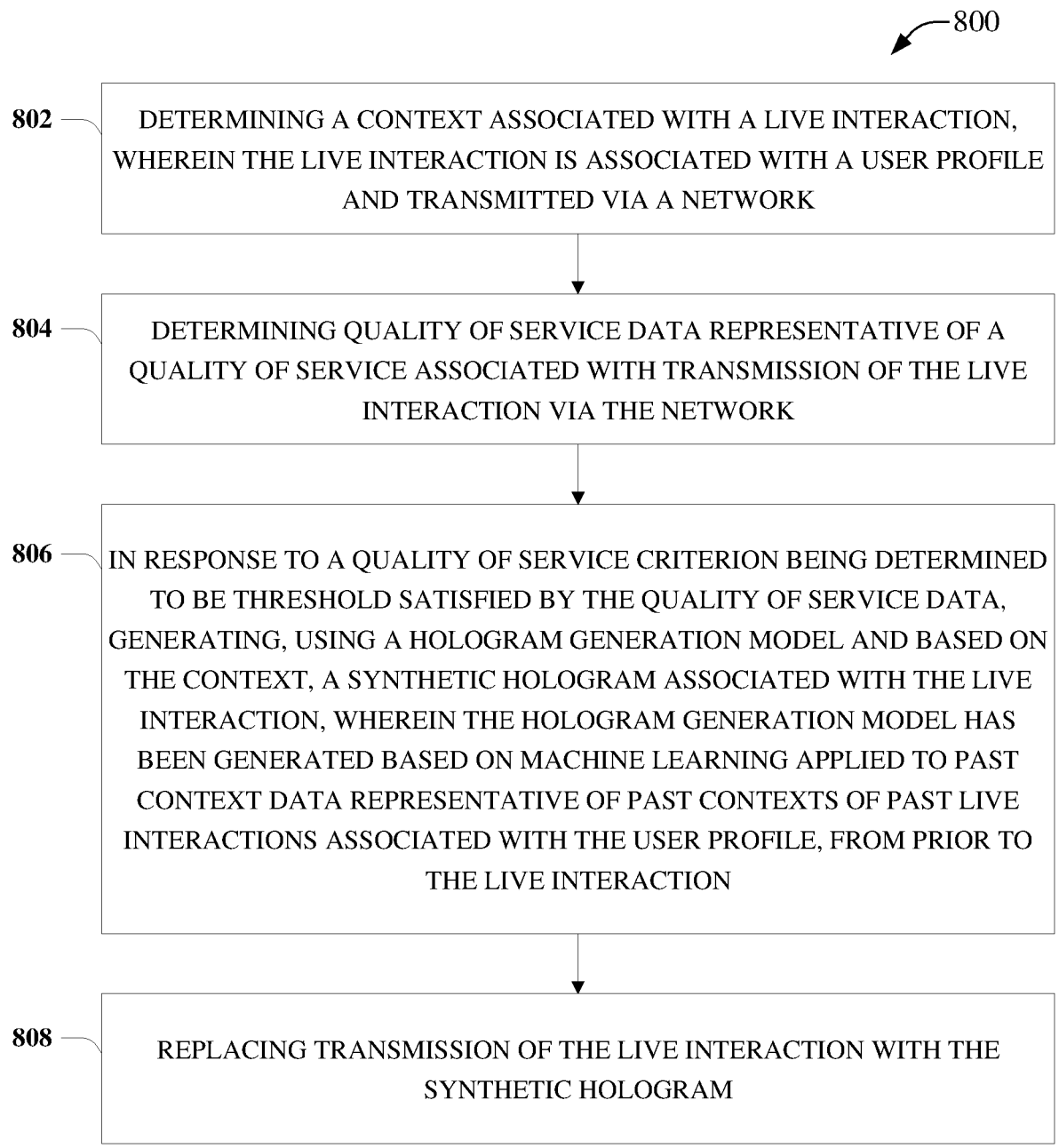
FIG. 8 is a block flow diagram for a process associated with hologram communication continuity in accordance with one or more embodiments described herein.

FIG. 8 illustrates a block flow diagram for a process 800 associated with hologram communication continuity in accordance with one or more embodiments described herein. At 802, the process 800 can comprise determining (e.g., using a context component 110) a context associated with a live interaction, wherein the live interaction is associated with a user profile and transmitted via a network (e.g., using a communication component 120). At 804, the process 800 can comprise determining (e.g., using a QoS component 112) QoS data representative of a QoS associated with transmission of the live interaction via the network. At 806, the process 800 can comprise in response to a QoS criterion being determined (e.g., by the QoS component 112) to be threshold satisfied by the QoS data, generating (e.g., by a hologram component 114), using a hologram generation model and based on the context, a synthetic hologram associated with the live interaction, wherein the hologram generation model has been generated based on machine learning (e.g., using ML component 116) applied to past context data representative of past contexts of past live interactions associated with the user profile, from prior to the live interaction (e.g., as stored in the data store 122). At 808, the process 800 can comprise replacing transmission of the live interaction with the synthetic hologram (e.g., via the communication component 120).

Figure 9:
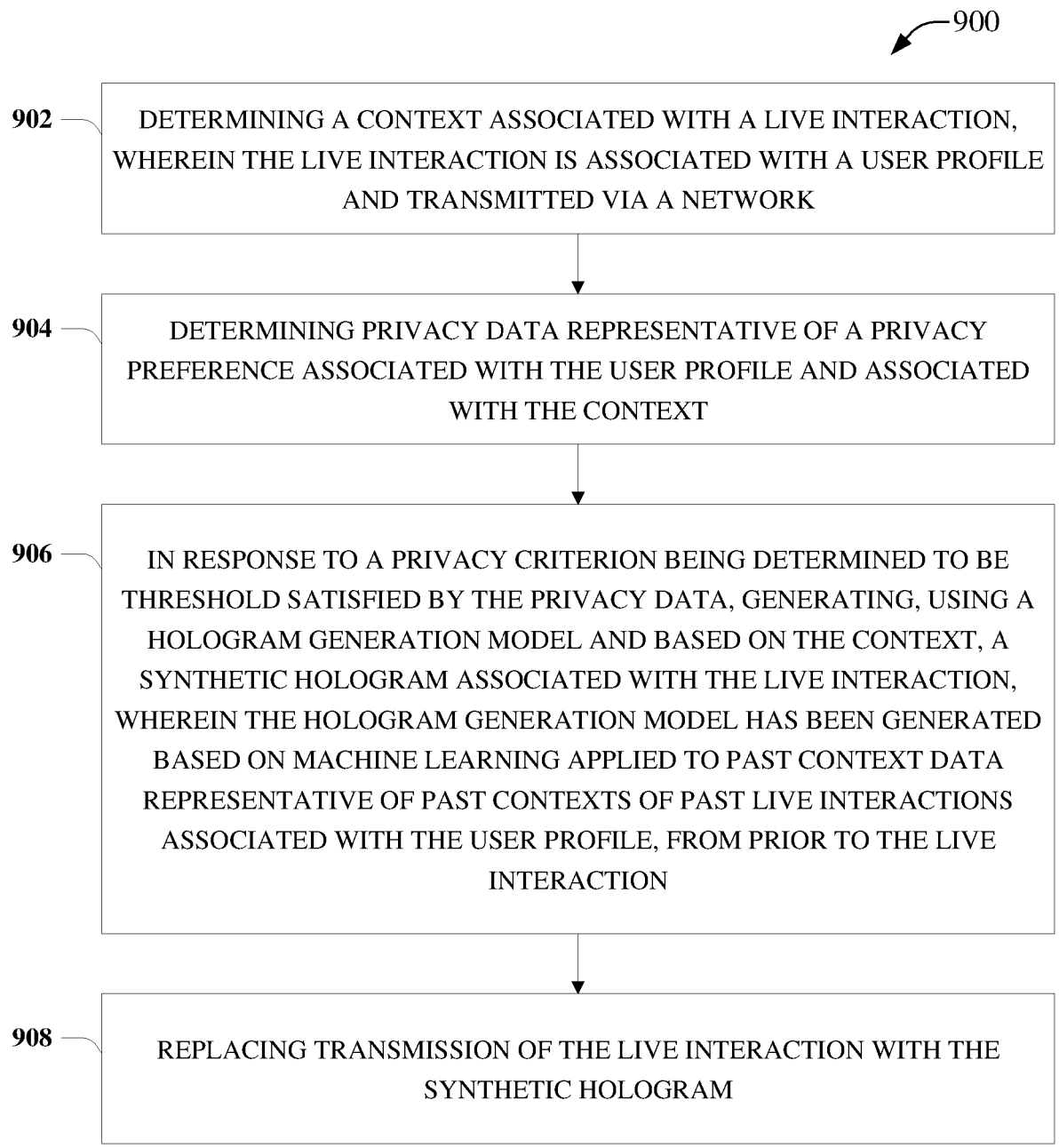
FIG. 9 is a block flow diagram for a process associated with hologram communication continuity in accordance with one or more embodiments described herein.

FIG. 9 illustrates a block flow diagram for a process 900 associated with hologram communication continuity in accordance with one or more embodiments described herein. At 902, the process 900 can comprise determining (e.g., using a context component 110) a context associated with a live interaction, wherein the live interaction is associated with a user profile and transmitted via a network (e.g., using a communication component 120). At 904, the process 900 can comprise determining (e.g., using a privacy component 304) privacy data representative of a privacy preference associated with the user profile and associated with the context. At 906, the process 900 can comprise in response to a privacy criterion being determined (e.g., by the privacy component 304) to be threshold satisfied by the privacy data, generating (e.g., by a hologram component 114), using a hologram generation model and based on the context, a synthetic hologram associated with the live interaction, wherein the hologram generation model has been generated based on machine learning (e.g., using ML component 116) applied to past context data representative of past contexts of past live interactions associated with the user profile, from prior to the live interaction (e.g., as stored in the data store 122). At 908, the process 900 can comprise replacing transmission of the live interaction with the synthetic hologram (e.g., via the communication component 120).

Figure 10:
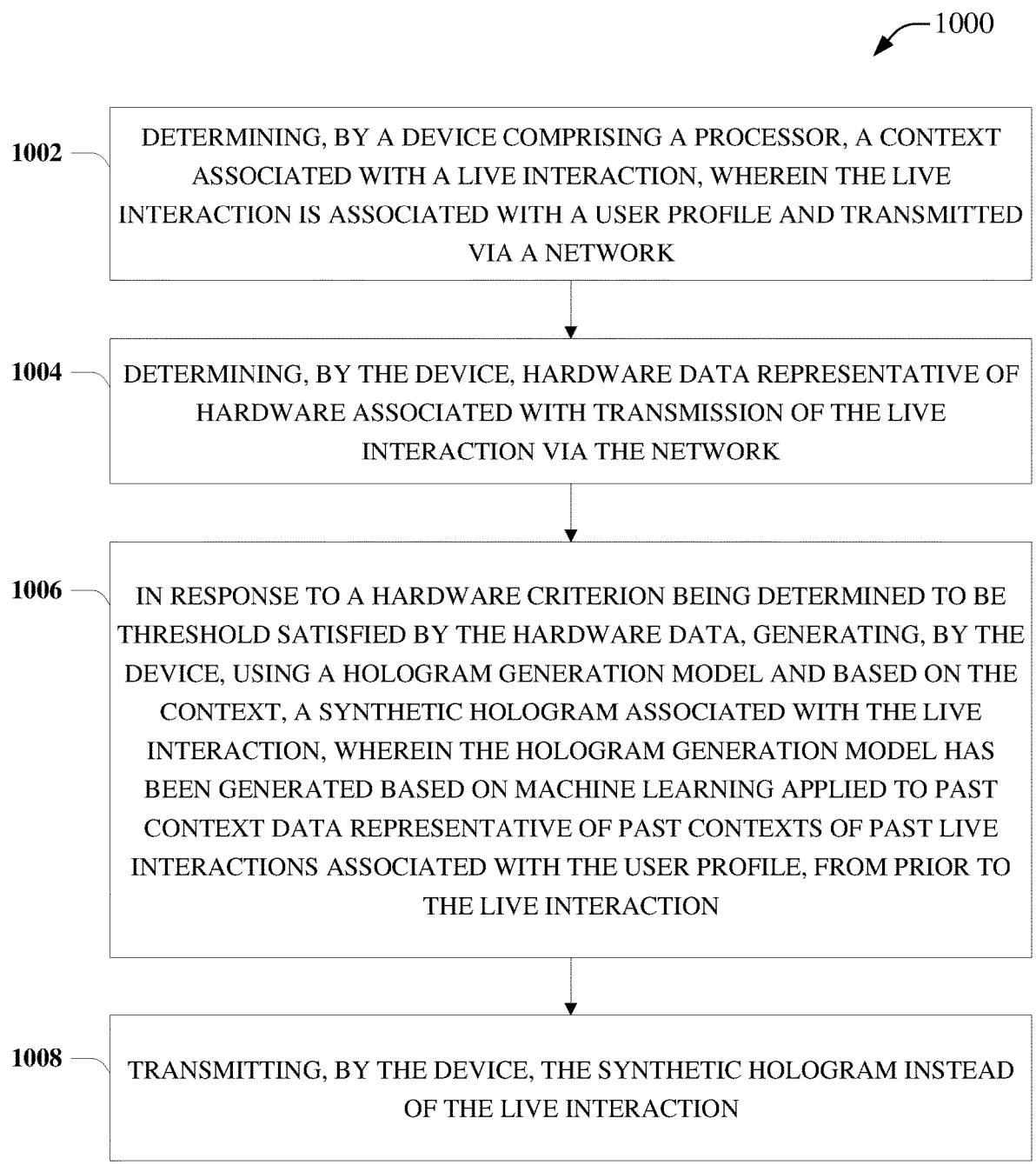
FIG. 10 is a block flow diagram for a process associated with hologram communication continuity in accordance with one or more embodiments described herein.

FIG. 10 illustrates a block flow diagram for a process 1000 associated with hologram communication continuity in accordance with one or more embodiments described herein. At 1002, the process 1000 can comprise determining, by a device comprising a processor (e.g., using a context component 110), a context associated with a live interaction, wherein the live interaction is associated with a user profile and transmitted via a network (e.g., using a communication component 120). At 1004, the process 1000 can comprise determining, by the device (e.g., using a hardware determination component 404), hardware data representative of hardware associated with transmission of the live interaction via the network. At 1006, the process 1000 can comprise in response to a hardware criterion being determined (e.g., by the hardware determination component 404) to be threshold satisfied by the hardware data, generating, by the device (e.g., using a hologram component 114), using a hologram generation model and based on the context, a synthetic hologram associated with the live interaction, wherein the hologram generation model has been generated based on machine learning (e.g., using ML component 116) applied to past context data representative of past contexts of past live interactions associated with the user profile, from prior to the live interaction (e.g., as stored in the data store 122). At 1008, the process 1000 can comprise transmitting, by the device (e.g., via the communication component 120), the synthetic hologram instead of the live interaction.

Figure 11:
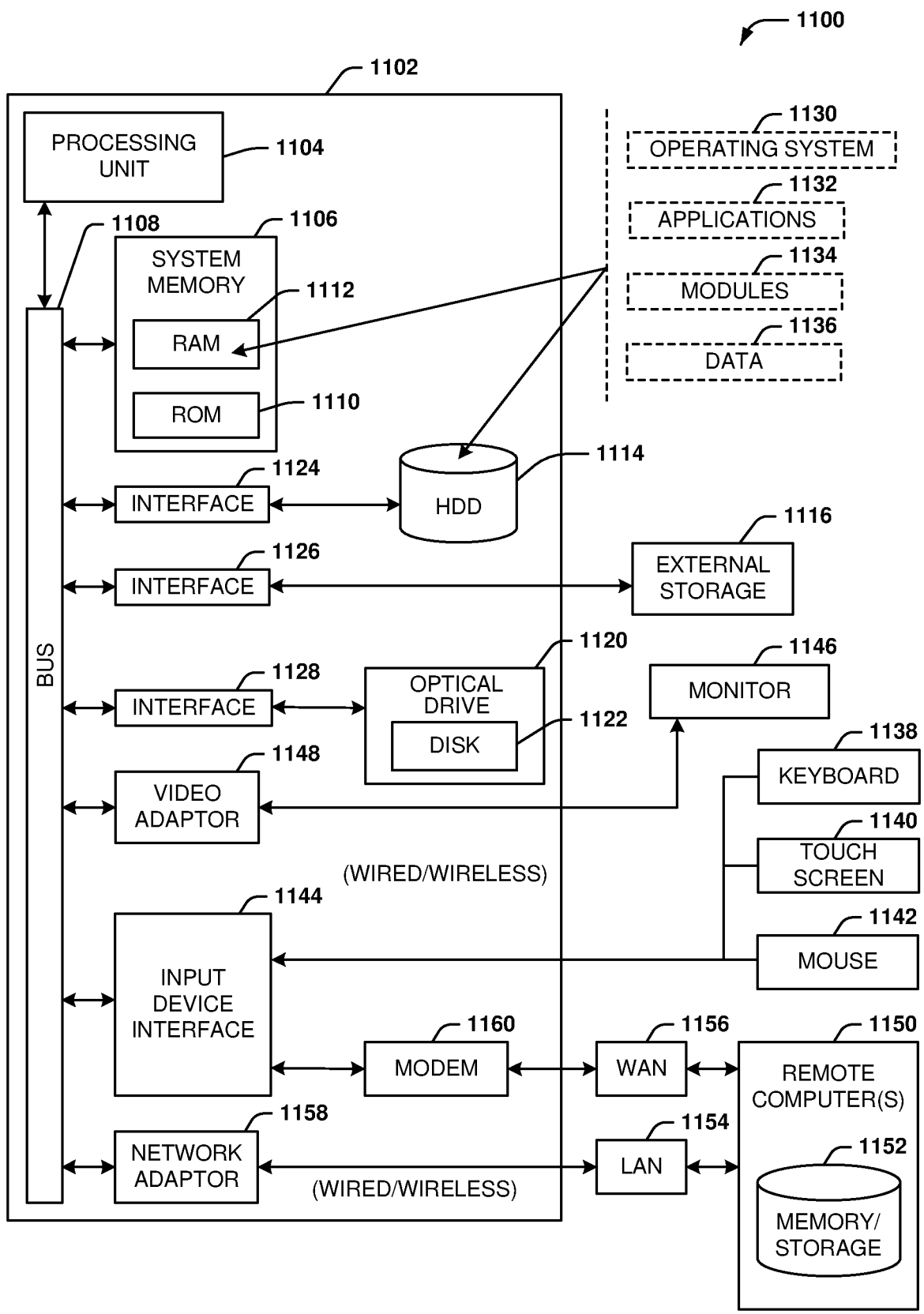
FIG. 11 is an example, non-limiting computing environment in which one or more embodiments described herein can be implemented.

In order to provide additional context for various embodiments described herein, FIG. 11 and the following discussion are intended to provide a brief, general description of a suitable computing environment 1100 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory, or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries, or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared, and other wireless media.

With reference again to FIG. 11, the example environment 1100 for implementing various embodiments of the aspects described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a non-volatile memory such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 (e.g., EIDE, SATA), one or more external storage devices 1116 (e.g., a magnetic floppy disk drive (FDD) 1116, a memory stick or flash drive reader, a memory card reader, etc.) and an optical disk drive 1120 (e.g., which can read or write from a CD-ROM disc, a DVD, a BD, etc.). While the internal HDD 1114 is illustrated as located within the computer 1102, the internal HDD 1114 can also be configured for external use in a suitable chassis (not shown). Additionally, while not shown in environment 1100, a solid-state drive (SSD) could be used in addition to, or in place of, an HDD 1114. The HDD 1114, external storage device(s) 1116 and optical disk drive 1120 can be connected to the system bus 1108 by an HDD interface 1124, an external storage interface 1126 and an optical drive interface 1128, respectively. The interface 1124 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally comprise emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can comprise one virtual machine (VM) of multiple VMs hosted at computer 1102. Furthermore, operating system 1130 can provide runtime environments, such as the Java runtime environment or the .NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, standalone, executable packages of software that include, e.g., code, runtime, system tools, system libraries and settings for an application.

Further, computer 1102 can be enable with a security module, such as a trusted processing module (TPM). For instance, with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1394 serial port, a game port, a USB port, an IR interface, a BLUETOOTH® interface, etc.

A monitor 1146 or other type of display device can be also connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the Internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are example and other means of establishing a communications link between the computers can be used.

When used in either a LAN or WAN networking environment, the computer 1102 can access cloud storage systems or other network-based storage systems in addition to, or in place of, external storage devices 1116 as described above. Generally, a connection between the computer 1102 and a cloud storage system can be established over a LAN 1154 or WAN 1156 e.g., by the adapter 1158 or modem 1160, respectively. Upon connecting the computer 1102 to an associated cloud storage system, the external storage interface 1126 can, with the aid of the adapter 1158 and/or modem 1160, manage storage provided by the cloud storage system as it would other types of external storage. For instance, the external storage interface 1126 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 12:
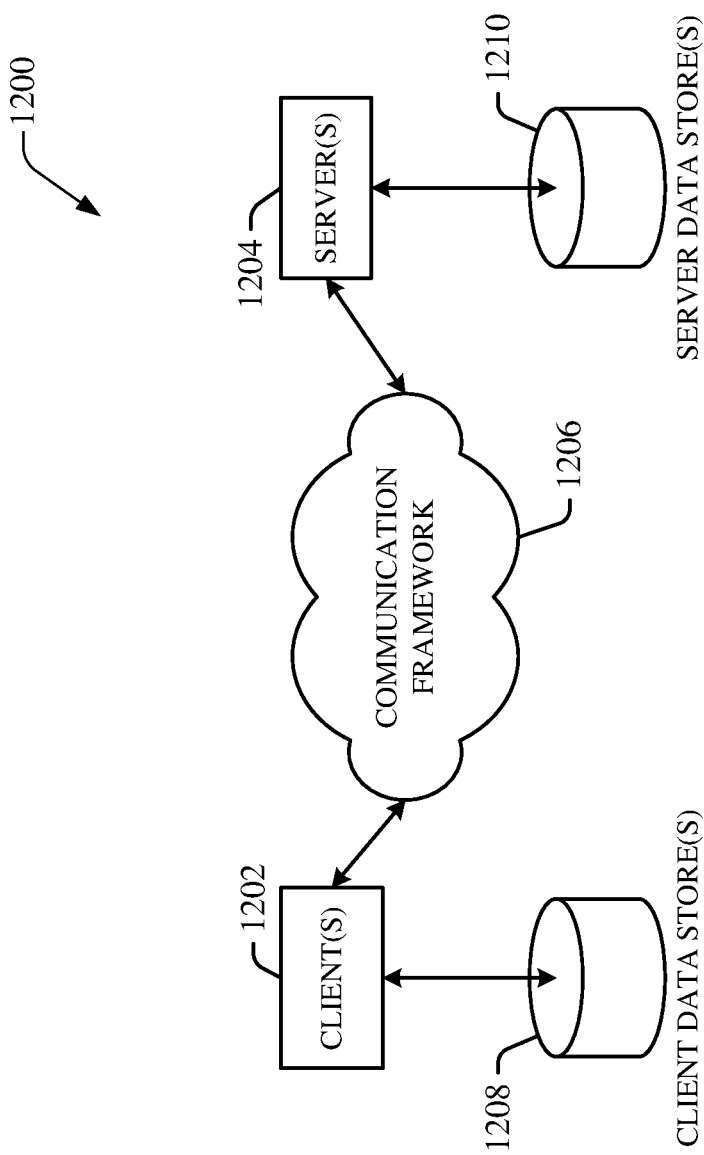
FIG. 12 is an example, non-limiting networking environment in which one or more embodiments described herein can be implemented.

Referring now to FIG. 12, there is illustrated a schematic block diagram of a computing environment 1200 in accordance with this specification. The system 1200 includes one or more client(s) 1202, (e.g., computers, smart phones, tablets, cameras, PDA's). The client(s) 1202 can be hardware and/or software (e.g., threads, processes, computing devices). The client(s) 1202 can house cookie(s) and/or associated contextual information by employing the specification, for example.

The system 1200 also includes one or more server(s) 1204. The server(s) 1204 can also be hardware or hardware in combination with software (e.g., threads, processes, computing devices). The servers 1204 can house threads to perform transformations of media items by employing aspects of this disclosure, for example. One possible communication between a client 1202 and a server 1204 can be in the form of a data packet adapted to be transmitted between two or more computer processes wherein data packets may include coded analyzed headspaces and/or input. The data packet can include a cookie and/or associated contextual information, for example. The system 1200 includes a communication framework 1206 (e.g., a global communication network such as the Internet) that can be employed to facilitate communications between the client(s) 1202 and the server(s) 1204.

Communications can be facilitated via a wired (including optical fiber) and/or wireless technology. The client(s) 1202 are operatively connected to one or more client data store(s) 1208 that can be employed to store information local to the client(s) 1202 (e.g., cookie(s) and/or associated contextual information). Similarly, the server(s) 1204 are operatively connected to one or more server data store(s) 1210 that can be employed to store information local to the servers 1204.

In one exemplary implementation, a client 1202 can transfer an encoded file, (e.g., encoded media item), to server 1204. Server 1204 can store the file, decode the file, or transmit the file to another client 1202. It is noted that a client 1202 can also transfer uncompressed file to a server 1204 and server 1204 can compress the file and/or transform the file in accordance with this disclosure. Likewise, server 1204 can encode information and transmit the information via communication framework 1206 to one or more clients 1202.

The illustrated aspects of the disclosure may also be practiced in distributed computing environments where certain tasks are performed by remote processing devices that are linked through a communications network. In a distributed computing environment, program modules can be located in both local and remote memory storage devices.

The above description includes non-limiting examples of the various embodiments. It is, of course, not possible to describe every conceivable combination of components or methods for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above-described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A system, comprising:
  a processor; and
  a memory that stores executable instructions that, when executed by the processor, facilitate performance of operations, comprising:
    determining a context associated with a live interaction, wherein the live interaction is associated with a user profile and transmitted via a network;
    determining quality of service data representative of a quality of service associated with transmission of the live interaction via the network;
    in response to a quality of service criterion being determined to be threshold satisfied by the quality of service data, generating, using a hologram generation model and based on the context, a synthetic hologram associated with the live interaction, wherein the hologram generation model has been generated based on machine learning applied to past context data representative of past contexts of past live interactions associated with the user profile, from prior to the live interaction; and
    replacing transmission of the live interaction with the synthetic hologram.

2. The system of claim 1, wherein the synthetic hologram is representative of a combination of a predicted view of a user associated with the user profile and a base hologram representative of a current view of the user associated with the user profile, and wherein the live interaction comprises the base hologram.

3. The system of claim 1, wherein the synthetic hologram is further generated based on a base image modified according to the context.

4. The system of claim 1, wherein the hologram generation model has been further generated based on the machine learning applied to past live interaction data associated with the past live interactions, and wherein respective past live interaction data is associated with respective past context data.

5. The system of claim 1, wherein:
  the user profile is a first user profile,
  the live interaction is between the first user profile and a second user profile, and
  the synthetic hologram is further generated based on relationship data representative of a relationship between the first user profile and the second user profile.

6. The system of claim 1, wherein the synthetic hologram is further generated in response to receiving a hologram activation signal indicative of a command to generate and replace the live interaction with the synthetic hologram.

7. The system of claim 1, wherein the context is associated with environmental data representative of an environment associated with the live interaction.

8. The system of claim 1, wherein the context is associated with emotional state data representative of an emotional state of a user associated with the user profile.

9. The system of claim 1, wherein the context is associated with conversation data representative of a conversation from the live interaction.

10. The system of claim 1, wherein the operations further comprise:
  in response to replacing the transmission of the live interaction with the synthetic hologram, determining whether the quality of service data no longer threshold satisfies the quality of service criterion; and
  in response to a determination that the quality of service data no longer threshold satisfies the quality of service criterion, replacing the synthetic hologram with the live interaction.

11. A non-transitory machine-readable medium, comprising executable instructions that, when executed by a processor, facilitate performance of operations, comprising:
  determining a context associated with a live interaction, wherein the live interaction is associated with a user profile and transmitted via a network;

determining quality of service data representative of a quality of service associated with transmission of the live interaction via the network;

in response to a quality of service criterion being determined to be threshold satisfied by the quality of service data, generating, using a hologram generation model and based on the context, a synthetic hologram associated with the live interaction, wherein the hologram generation model has been generated based on machine learning applied to past context data representative of past contexts of past live interactions associated with the user profile; and replacing transmission of the live interaction with the synthetic hologram.

12. The non-transitory machine-readable medium of claim 11, wherein the synthetic hologram is representative of a combination of a predicted view of a user associated with the user profile and a base hologram representative of a current view of the user associated with the user profile, and wherein the live interaction comprises the base hologram.

13. The non-transitory machine-readable medium of claim 11, wherein the synthetic hologram is further generated based on a base image modified according to the context.

14. The non-transitory machine-readable medium of claim 11, wherein the hologram generation model has been further generated based on the machine learning applied to past live interaction data associated with the past live interactions, and wherein respective past live interaction data is associated with respective past context data.

15. The non-transitory machine-readable medium of claim 11, wherein:
   the user profile is a first user profile,
   the live interaction is between the first user profile and a second user profile, and
   the synthetic hologram is further generated based on relationship data representative of a relationship between the first user profile and the second user profile.

16. The non-transitory machine-readable medium of claim 11, wherein the synthetic hologram is further generated in response to receiving a hologram activation signal indicative of a command to generate and replace the live interaction with the synthetic hologram.

17. The non-transitory machine-readable medium of claim 11, wherein the context is associated with environmental data representative of an environment associated with the live interaction.

18. The non-transitory machine-readable medium of claim 11, wherein the context is associated with emotional state data representative of an emotional state of a user associated with the user profile.

19. The non-transitory machine-readable medium of claim 11, wherein the context is associated with conversation data representative of a conversation from the live interaction.

20. A method, comprising:
   determining, by a processing system including a processor, a context associated with a live interaction, wherein the live interaction is associated with a user profile and transmitted via a network;
   determining, by the processing system, quality of service data representative of a quality of service associated with transmission of the live interaction via the network;
   in response to a quality of service criterion being determined to be threshold satisfied by the quality of service data, generating, by the processing system, using a hologram generation model and based on the context, a synthetic hologram associated with the live interaction, wherein the hologram generation model has been generated based on machine learning applied to past context data representative of past contexts of past live interactions associated with the user profile; and
   replacing, by the processing system, transmission of the live interaction with the synthetic hologram.

* * * * *